T. M. HENDRICKSON.
ROOST.
APPLICATION FILED APR. 27, 1908.
908,261.
Patented Dec. 29, 1908.
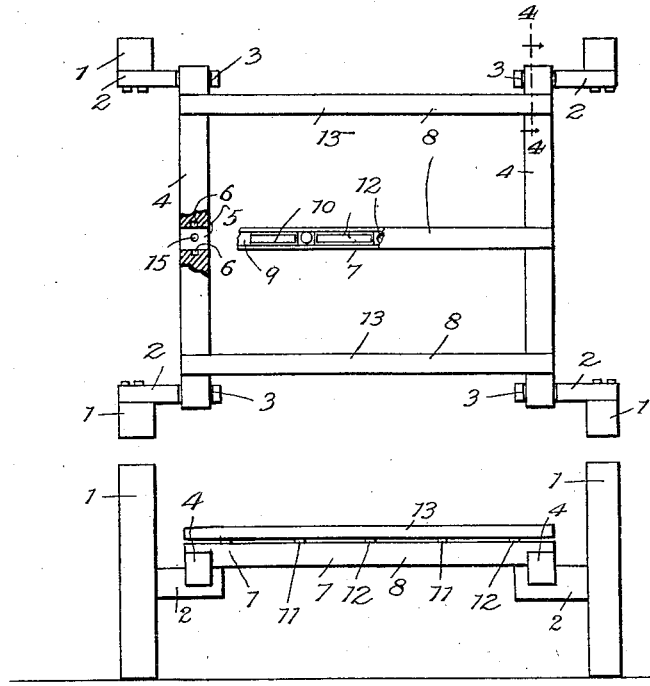
Fig. 1.
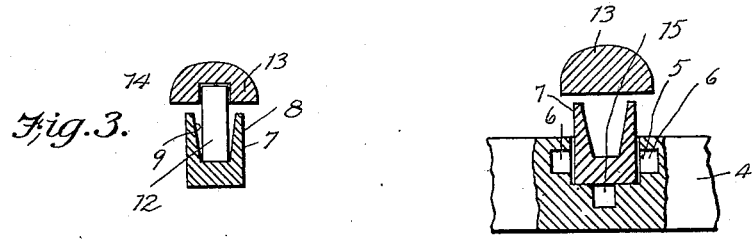
Fig. 2.
Fig. 3.
Fig. 4.
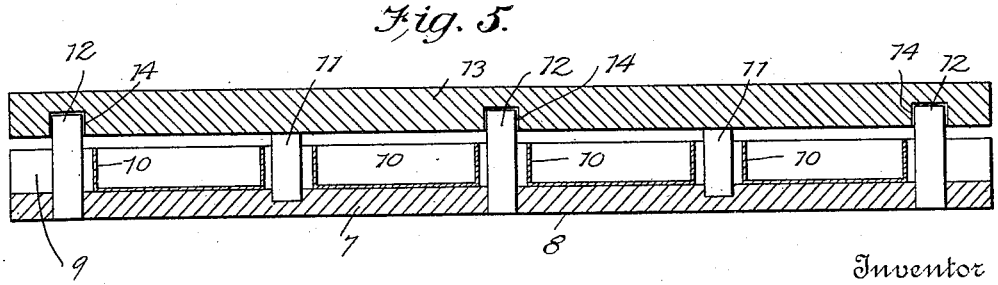
Fig. 5.
Witnesses
George Hilton
C. H. Griesbauer
Inventor
Thos. M. Hendrickson,
By H. B. Willson & Co
Attorneys
THE NORRIS PETERS CO., WASHINGTON, D. C.

UNITED STATES PATENT OFFICE.

THOMAS M. HENDRICKSON, OF LEES SUMMIT, MISSOURI.

ROOST.

No. 908,261.	Specification of Letters Patent.	Patented Dec. 29, 1908.

Application filed April 27, 1908. Serial No. 429,471.

*To all whom it may concern:*

Be it known that I, THOMAS M. HENDRICKSON, a citizen of the United States, residing at Lees Summit, in the county of Jackson and State of Missouri, have invented certain new and useful Improvements in Roosts; and I do declare the following to be a full, clear, and exact description of the invention, such as will enable others skilled in the art to which it appertains to make and use the same.

My invention relates to roosts for fowls.

The object of the invention is to provide a simple, cheap, sanitary roost which will be efficient and thorough in its operation.

With these and other objects in view, the invention consists of certain novel features of construction, combination and arrangement of parts, as will be more fully described and particularly pointed out in the appended claims.

In the drawings, Figure 1 is a top plan view with parts broken away, Fig. 2 is a side elevation of the roost, Fig. 3 is a transverse section of one of the roost poles, Fig. 4 is a detail fragmentary section on the line 4—4 of Fig. 1, and Fig. 5 is a detail longitudinal section of one of the roost poles.

Referring more especially to the drawings, 1 represents suitable posts to which the supporting cleats 2, are attached in any suitable manner so as to project outwardly therefrom. The outer end of the arms 2 is notched at 3, to support the perch holding bars 4. These perch holding bars are notched along their length at given intervals as at 5, and adjacent the notches are provided pockets 6, in which suitable insect powder may be carried. Seated in the notches and secured therein in any suitable manner are the bottom pieces 7, of the perches 8, only a few being here shown. These bottom pieces are grooved at 9, upon their upper side to receive insect powder, and suitable tanks are held therein so that a supply of disinfecting fluid can be carried in the perch bars and be exposed to the atmosphere so as to give off its disinfecting odors. Preferably four pans to the perch are provided.

Extending upwardly from the bottom of the groove 9 are posts 11 and 12, the former being considerably shorter than the latter and acting as limiting studs for the top piece 13, upon which the fowls stand. The posts 12 enter apertures 14, formed in the under side of the top piece 13 and hold it in alinement upon the bottom 7.

When the fowl stands upon the top piece 13, and flaps his wings the powder is scattered around and works itself in the feathers of the fowl, thereby killing any vermin which may be there. It also flies around the house when scattered in such a manner and prevents insects and vermin from collecting in the crevices of the walls of the abode. The top pieces 13 may be removed at any time to replace or replenish the disinfecting liquid in the tanks 10, or the powder in the grooves 9. The apertures arranged adjacent the perch supporting notches prevent vermin from collecting around the joints between the supporting bar 4 and the perch 6, and if necessary I may form an aperture 15 in the bottom of the notch 5, so as to hold a suitable quantity of insect powder.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention what I claim and desire to secure by Letters Patent is:—

1. In a roost, supporting bars having perch-receiving notches and sockets or recesses extending away from said notches, perch supports seated in said notches and covering said sockets or recesses, and perches carried upon said supports and separated therefrom.

2. In a roost, supporting bars having perch-receiving notches and sockets or recesses extending away from said notches, perch supports seated in said notches and covering said sockets, perches carried by said supports and separated therefrom, and means carried by the supports for holding disinfecting material.

3. In a roost, supporting bars having perch-receiving notches and sockets or recesses extending away from said notches, grooved perch supports seated in said notches and covering said sockets, perches carried upon said supports and separated
5 therefrom, and means carried in the grooves of said supports for holding disinfecting material.

In testimony whereof I have hereunto set my hand in presence of two subscribing witnesses.

THOMAS M. HENDRICKSON.

Witnesses:
H. Z. CARPENTER,
TODD M. GEORGE.